Figure 1:
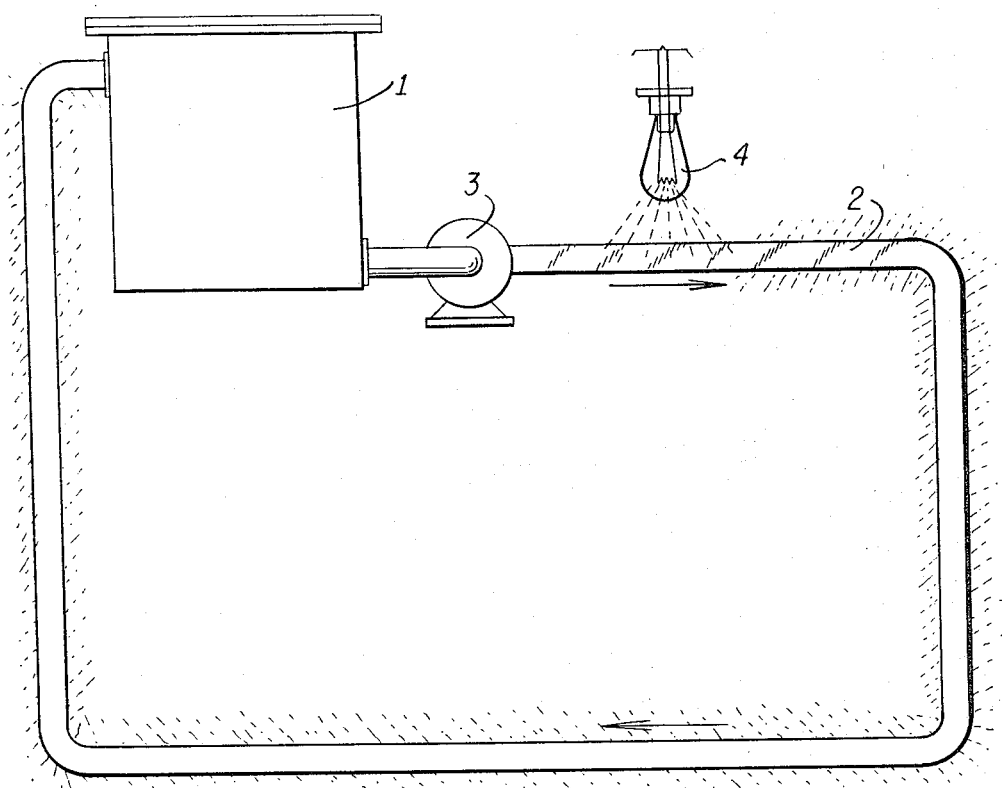

Dec. 13, 1966  J. STEERUP  3,291,749
PHOTO-LUMINESCENT COMPOSITION CONSISTING ESSENTIALLY
OF BORIC ACID AND FLUORESCEIN
Filed Aug. 14, 1963

INVENTOR.
James Steerup
BY
Wolfe, Hubbard, Voit & Osann.
Attys.

United States Patent Office 3,291,749
Patented Dec. 13, 1966

3,291,749
PHOTO-LUMINESCENT COMPOSITION CONSISTING ESSENTIALLY OF BORIC ACID AND FLUORESCEIN
James Steerup, Park Ridge, Ill., assignor to Triaxon, Inc., Glenview, Ill., a corporation of Illinois
Filed Aug. 14, 1963, Ser. No. 302,204
7 Claims. (Cl. 252—301.3)

This invention relates to a photo-luminescent composition and a method and apparatus of employing such a composition.

A luminescent material, as distinguished from an incandescent material, emits light at low temperatures after it has been previously excited by the absorption of energy. While a luminescent material absorbs energy and subsequently emits part of this energy as light, a dye or pigment when exposed to light energy merely reflects part of the light energy and absorbs the remainder.

The phenomenon of luminescence is believed to involve the absorption of energy that excites one or more electrons bonded to an atom or group of atoms, at least part of the excitation energy subsequently being emitted as light. According to the quantum mechanics theory proposed for the luminescence phenomenon, an excited atom can exist indefinitely at absolute zero. However, at higher temperatures, a given atom can be excited to exist briefly in one of several separate and distinct states of higher energy, but not in any intermediate state. Each energy state of the atom corresponds to a different configuration of its electrons. When the excited atom drops in energy from one of the sharply defined high energy levels to a similarly sharp lower energy level, the difference in energy is emitted as a discrete quantum of radiation or light energy known as a photon. When isolated, all atoms are somewhat luminescent if properly excited. However, the energy level of an excited atom in a molecule is influenced by the one or more adjacent atoms which can dissipate this excitation energy in the form of heat energy by atomic collision or, where the excited atom is bonded to one or more of the adjacent atoms, by increasing the atomic motion or oscillations of the atoms relative to each other. Thus, atomic collisions which are required for thermal light emission prevent luminescent light emission. The probability of dissipating potential luminescence emission energy, by conversion into heat energy, is enormously increased upon going from an isolated atom or molecule to a pure, elemental liquid or solid where the excited atom is bonded to myriads of identical atoms. As would be expected, therefore, most pure, elemental liquids and solids are either non-luminescent or are inefficiently luminescent.

There are many various types of luminescence, such as
Chemiluminescence which involves a chemical reaction, usually oxidation;
Electroluminescence which involves excitation by electrons;
Radioluminescence which involves excitation by a radioactive substance; and
Photoluminescence which involves excitation by some form of light.

A photoluminescent substance generally comprises a host compound and a small proportion of an activator. The conventional host compounds are usually metal salts such as calcium sulfide, zinc sulfide, beryllium sulfide, cadmium sulfide and zinc silicate. Conventional activators are usually metals such as bismuth, copper, silver, manganese and chromium. Each activator is adapted for use with a specific host compound. As a rule, the host compound without the activator does not exhibit luminescent properties. It has been postulated that the host compound functions as a medium in which to suspend the activator atoms which, with the adjacent atoms of the host compound, provide discrete "centres" for localized absorption of excitation energy and subsequent emission of at least part of the absorbed energy as light. If an excess amount of activator is employed, the centres become poisoned or incapacitated with the result that the substance becomes non-luminescent.

It is an object of this invention to provide a photo-luminescent composition characterized by high brightness and high degree of light retention after the light source has been removed.

It is another object of this invention to provide a photoluminescent composition which employs a readily available, commercially inexpensive material as the host compound.

Another object of the invention is to provide a durable transparent carrier for a photo-luminescent composition.

A further object of this invention is to provide a method and apparatus for mobilizing a photo-luminescent composition so as to present the appearance of "fluid light."

Another object of this invention is to provide a photoluminescent composition in the form of a readily mobilized fluid.

Figure 2:
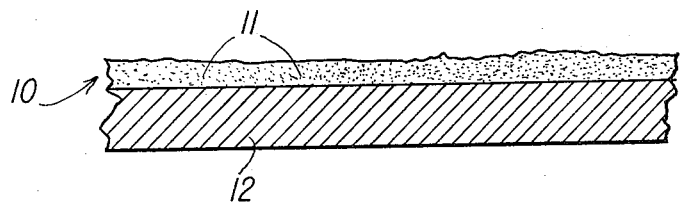

Other objects and advantages of this invention will become apparent upon consideration of the following specification and claims when read in conjunction with the accompanying drawing in which FIGURE 1 is a schematic illustration of a suitable method and apparatus for mobilizing a photo-luminescent composition, and FIGURE 2 is an enlarged cross-sectional illustration of a preferred embodiment of the invention in which the photo-luminescent composition is dispersed within a clear plastic coating.

The photo-luminescent composition of this invention employs boric acid crystals as the host compound and fluorescein as the activator. Fluorescein has the empirical formula $C_{20}H_{12}O_5$ and the structural formula

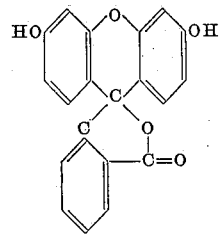

The activator, fluorescein, may be employed in amounts ranging from 0.001% to 0.3% by weight of the host compound, boric acid crystals. However, it is preferred to employ the activator in amounts ranging from 0.02% to 0.1% by weight.

As the relative amount of fluorescein in the photoluminescent composition is increased within the stated range, the luminescent color of the composition will change from blue to a blue-green of greater brilliance. Although it is preferred to use U.S.P. fluorescein, any commercially available grade of fluorescein may be employed with some sacrifice in the brilliance of the luminescent effect.

In order to obtain an efficient photo-luminescent composition it has been found necessary to employ boric acid, as distinguished from salts of boric acid. In addition, the boric acid must be in crystalline form. Although it is preferred to employ U.S.P. boric acid crystals, commercial grade boric acid crystals may also be used in the practice of this invention.

Neither boric acid crystals nor fluorescein by themselves possess photo-luminescent properties. The same is true of a mere physical mixture of the boric acid crystals and fluorescein. In order to obtain the photo-luminescent composition of this invention, it is necessary to fuse the mixture of boric acid crystals and fluorescein, preferably at a temperature between 320° F. and 450° F. This fusion can be accomplished by melting the boric acid crystals and thereafter adding the fluorescein or by forming a mixture of the two components and thereafter melting the mixture. As soon as the boric acid crystals are melted, the fluorescein rapidly and automatically disperses itself in the melted host compound. After the mixture has been fused, it is cooled and, if desired, ground into a powder of a particle size such that the crystalline structure of the boric acid is retained.

If it is desired to employ the photo-luminescent composition in the form of a sheet, the fused mixture is cast as a sheet and slowly cooled to prevent rapid crystallization which would cause cracks to appear in the finished sheet. The cooled sheet has a glazed, glass-like appearance.

The photo-luminescent composition of this invention is excited to luminescence by being exposed to light, both visible light and ultraviolet light. Both sunlight and light from fluorescent lamps provide excellent photo-luminescent effects. Exposure to infra-red rays does not cause the composition of this invention to exhibit photo-luminescent properties for the apparent reason that the heat from infra-red rays causes increased atomic collisions which as previously mentioned destroys photo-luminescent emission. The photo-luminescent composition of this invention when exposed to a source of light will exhibit a high degree of brilliance and a luminescent retention period of from five to ten seconds after the light source has been removed, i.e., under an extreme heavy input of light, it is possible to obtain a luminescent retention of approximately two minutes. The duration of luminescent retention as well as the degree of brightness of the composition is directly proportional to the intensity of the light source and the distance between the light source and the composition, after excitation.

The luminescent properties of the composition of this invention are optimum at room temperature. As the temperature increases, the luminescent properties of the composition decrease; however, a decrease in temperature does not have any adverse effect on the luminescent properties of the composition. Even if the luminescent composition is exposed to temperatures high enough to render the composition non-luminescent, it completely regains its luminescent properties upon being cooled.

The photo-luminescent composition of this invention may be produced as a fused mixture in the form of a cast sheet, in the form of crystals which may be finely divided and/or compressed into solid forms, or as a suspension in a non-aqueous liquid. The composition may also be produced as a non-fused mixture permitting the manufacturer of a fabricated product employing such luminescent composition to fuse the mixture when desired. The mixture of boric acid crystals and fluorescein may also contain inert fillers, which are preferably transparent, such as glass beads or glass fibers.

As boric acid crystals absorb moisture from the surrounding atmosphere and as absorbed moisture decreases the luminescent properties of the fused mixture of boric acid crystals and fluorescein, it is desirable to protect the luminescent composition from the atmosphere or reactivate the composition before use by heating to expel the absorbed moisture. The luminescent composition in the form of finely divided crystals can be protected from the atmosphere by packaging the same in hermetically sealed containers or by dispersing the same in a non-aqueous liquid which is not a solvent for boric acid. If the photo-luminescent composition is in the form of a sheet it can be protected from the moisture of the atmosphere by a clear protective layer of an non-solvent material such as acrylic resins, paraffins, silicones, etc., or in the form of a mixture with a clear polyester plastic as described in greater detail hereinafter.

The following examples will more fully illustrate the present invention. It is to be understood that the scope of this invention is not meant to be limited to the specific details of the example. In all of the examples, the parts of ingredients are given as parts by weight.

*Example I*

The following mixtures of boric acid crystals and fluorescein U.S.P. were formed and fused at 450° F. for approximately forty-five minutes:

| Sample | Boric Acid Crystals, Parts | Fluorescein, Part |
| --- | --- | --- |
| A | 1,000 | 1 |
| B | 2,000 | 1 |
| C | 3,000 | 1 |
| D | 4,000 | 1 |
| E | 5,000 | 1 |

After exposing the cooled samples to a light source, visual observation of the degree of the brilliance and duration of luminescent retention indicated that all samples were good with Sample E being outstanding.

*Example II*

The following mixtures of boric acid crystals and fluorescein U.S.P. were prepared by the method of Example I:

| Sample | Boric Acid Crystals, Parts | Fluorescein, Part | Filler, Parts |
| --- | --- | --- | --- |
| A | 6,000 | 1 | None |
| B | 11,000 | 1 | None |
| C | 16,000 | 1 | None |
| D | 1,000 | 1 | None |
| E | 1,000 | 1 | [1] 1,000 |
| F | 1,000 | 1 | [2] 1,000 |
| G | 1,000 | 1 | [3] 1,000 |

[1] #1700 Super Brilliant Glass Beads.
[2] #1800 Standard Glass Beads.
[3] #8 Standard Glass Beads.

Visual observation of the degree of brilliance and duration of luminescent retention indicated that increasing the proportion of boric acid crystals relative to fluorescein results in a decrease in brilliance and that the inclusion of glass bead fillers had no adverse effect on brilliance or luminescent retention.

The photo-luminescent composition can be employed in sheet form for the reproduction of a light image. The fact that light entering a sheet of this composition does not diffuse is shown by the fact that light can be passed through a half-tone negative and the image produced by the subsequent luminescent light emission is formed with extreme clarity.

In one especially useful embodiment of the composition of this invention the boric acid-fluorescein mixture is incorporated into a clear polyester plastic preferably of low viscosity. The fluid composition thus formed can then be molded, cast in sheet form, or simply applied to a surface in the form of a thin coating in much the same manner as a paint. As the plastic hardens it forms an excellent protection for the active boric acid-fluorescein mixture against moisture. Suitable clear polyester plastics are available from General Electric Company, Freeman Chemical Company and Minnesota Mining and Manufacturing Company.

Referring to FIGURE 2 of the drawing, the clear polyester plastic is shown as a relatively thin coating 10 having fine particles 11 of the boric acid-fluorescein mixture uniformly dispersed therein. The coating is shown applied to a base 12 which may be a board or other supporting surface, as a signboard.

The photo-luminescent composition may also be applied to a surface, which is preferably opaque or reflective, by either glazing the crystals on the surface or by dispersing the crystals in a low-melting, transparent, non-solvent material such as paraffin and applying the dispersion to the surface. In the latter instance, the paraffin also functions as a protection against absorption of moisture from the atmosphere. In the former instance, a protective coating is subsequently applied. Although the thickness of the coating may be of molecular dimensions, such as a one-ten thousandths inch film, excellent results have been obtained with a coating having a thickness of approximately one-sixteenth of an inch.

A photo-luminescent composition can be mobilized by suspending the photo-luminescent composition in a non-aqueous liquid, such as mineral oil. In the case of a fused mixture of boric acid crystals and fluorescein, the liquid should be a non-solvent for the mixture.

The schematic figure of the drawing illustrates a suitable method and apparatus for mobilizing a suspension of a photo-luminescent composition in a liquid wherein the liquid suspension is contained in a reservoir 1. A transparent conduit 2 is connected to the reservoir 1 and suitable means such as a pump 3 is provided for passing the liquid suspension through the conduit 2. A light source 4 is provided adjacent to the transparent conduit 2. In operation, the liquid suspension is pumped from the reservoir 1 through the transparent conduit 2 where it is exposed to the light source 4. The light excites the photo-luminescent composition suspended in the liquid so that the liquid suspension will emit luminescent light through the walls of the transparent conduit after it has passed the light source. In this manner, conveyance of light in a liquid form is achieved. It will be appreciated that the transparent conduit can be made of a flexible material, permitting a number of uses such as a flexible light probe for internal medicine purposes, thereby avoiding the danger of glass breakage and heat involved in conventional light means employed for this purpose. The mobilized light of this invention can also be used for providing explosion-proof lighting in locations such as mines and grain storage buildings, where the danger of gaseous explosion by electric discharge is present.

Another application of the mobilized light of this invention is in employing a light source to impose an image upon the liquid suspension and thereafter passing the excited photo-luminescent liquid suspension through the transparent conduit for viewing. The photo-luminescent composition of this invention permits such an application as it has a relatively high degree of reproduction fidelity of the image imposed by the light source.

In general, the photo-luminescent composition of this invention may be employed wherever cold light emission of short duration is desired and where an excitation light source is available. Thus, the composition may be employed as a coating for a target used with a light pistol. The composition may also be employed as an interior coating for fluorescent lamps which conventionally are constructed in the form of an elongated tubular envelope having electrodes sealed into the ends thereof and contain a gaseous atmosphere which may be a mixture of a rare gas and mercury. The interior coating is excited to luminescence by ultraviolet light emitted by the discharge of the lamp. Application is also found in safety devices where road marks can be formed from this photo-luminescent composition by itself or in a mixture with a reflective filler. This composition may also be employed as a background or coating for a flashing electric sign to achieve unusual lighting effects and provide illumination in the intervals between flashes of electric light.

While the invention has been shown and described in the preferred form, it is to be understood that various changes and modifications may be made therein by one skilled in the art without departing from the principle of the invention and it is intended to cover all those changes and modifications which come within the scope of the appended claims.

I claim as my invention:
1. A photo-luminescent composition consisting essentially of boric acid crystals fused with from 0.001% to 0.3% fluorescein based on the weight of said boric acid crystals.
2. A photo-luminescent composition consisting essentially of a host compound fused with an activator, said host compound being boric acid crystals and said activator being fluorescein, the amount of activator ranging from 0.02% to 0.1% by weight of the host compound.
3. A composition which becomes photo-luminescent when fused consisting essentially of boric acid crystals and from 0.001% to 0.3% fluorescein based on the weight of said boric acid crystals.
4. A composition which becomes photo-luminescent when fused consisting essentially of a host compound and an activator, said host compound being boric acid crystals and said activator being fluorescein, the amount of activator ranging from 0.02% to 0.1% by weight of the host compound.
5. A method of making a photo-luminescent composition consisting essentially of the steps of fusing a mixture of boric acid crystals and fluorescein and cooling the fused mixture, the amount of fluorescein ranging from 0.001% to 0.3% by weight of boric acid crystals.
6. A method of making a photo-luminescent composition as defined in claim 5 wherein the amount of fluorescein ranges from 0.02% to 0.1% by weight of the boric acid crystals.
7. A fluid photo-luminescent composition consisting essentially of a fused mixture of boric acid crystals with from 0.02% to 0.1% fluorescein based on the weight of said boric acid crystals, suspended in a non-aqueous liquid carrier which is a non-solvent for the fused mixture.

References Cited by the Examiner
UNITED STATES PATENTS

| | | | |
|---|---|---|---|
| 2,298,968 | 10/1942 | Roberts | 252—301.3 X |
| 2,519,825 | 8/1950 | De Ment | 250—71 |
| 2,936,371 | 5/1960 | White et al. | 250—71 |
| 2,945,128 | 7/1960 | Sun et al. | 250—71 X |

RALPH G. NILSON, *Primary Examiner.*

ARCHIE R. BORCHELT, *Examiner.*